(12) United States Patent
Rana

(10) Patent No.: US 12,480,172 B2
(45) Date of Patent: Nov. 25, 2025

(54) METHOD OF MAKING A COLD FORMABLE HIGH STRENGTH STEEL STRIP AND STEEL STRIP

(71) Applicant: TATA STEEL IJMUIDEN B.V., JZ Velsen-Noord (NL)

(72) Inventor: Radhakanta Rana, Alkmaar (NL)

(73) Assignee: TATA STEEL IJMUIDEN B.V., Ijmuiden (NL)

( * ) Notice: Subject to any disclaimer, the term of this patent is extended or adjusted under 35 U.S.C. 154(b) by 805 days.

(21) Appl. No.: 17/780,451

(22) PCT Filed: Nov. 27, 2020

(86) PCT No.: PCT/EP2020/083812
§ 371 (c)(1),
(2) Date: May 26, 2022

(87) PCT Pub. No.: WO2021/105489
PCT Pub. Date: Jun. 3, 2021

(65) Prior Publication Data
US 2023/0010877 A1  Jan. 12, 2023

(30) Foreign Application Priority Data
Nov. 27, 2019  (EP) .................................... 19211951

(51) Int. Cl.
*C21D 8/02* (2006.01)
*C21D 9/52* (2006.01)
(Continued)

(52) U.S. Cl.
CPC ......... *C21D 8/0226* (2013.01); *C21D 8/0205* (2013.01); *C21D 8/0236* (2013.01);
(Continued)

(58) Field of Classification Search
None
See application file for complete search history.

(56) References Cited

U.S. PATENT DOCUMENTS

| 2016/0340761 A1 | 11/2016 | Garza-Martinez et al. |
| 2017/0114433 A9 | 4/2017 | Jun et al. |
| 2021/0010101 A1 | 1/2021 | Endo et al. |

FOREIGN PATENT DOCUMENTS

| CN | 108546812 A | * | 9/2018 | ............. C22C 38/46 |
| WO | 2009142362 A1 | | 11/2009 | |

(Continued)

OTHER PUBLICATIONS

Written Opinion and International Search of corresponding PCT Application No. PCT/EP2020/083812 mailed Dec. 23, 2020.

*Primary Examiner* — Anthony M Liang
(74) *Attorney, Agent, or Firm* — Vorys, Sater, Seymour and Pease LLP; Anthony P. Venturino; Maryellen Feehery Hank

(57) ABSTRACT

A method of manufacturing steel strip including the steps of:
casting molten steel into slabs;
reheating the slabs at 1150° C. or more for 1 hour or more;
hot rolling the steel into a strip, preferably with an average F1 slab entry temperature above 1000° C.;
coiling the hot rolled steel strip;
batch annealing the steel strip:
at an intercritical temperature (i.e. between Ac1 and Ac3), preferably below 700° C.;
in non-oxidising and non-nitrogenated atmosphere;
total annealing time at least 5 hours, preferably at least 10 hours to get Mn enrichment in austenite such that Mn content is at least 1.25 times bulk Mn content of the steel and C enrichment such that C content is at least 1.2 times bulk C content of the steel;
(Continued)

cooling the steel after batch annealing in air, forced air or water quench.

17 Claims, 1 Drawing Sheet

(51) Int. Cl.
| | |
|---|---|
| C22C 38/02 | (2006.01) |
| C22C 38/06 | (2006.01) |
| C22C 38/22 | (2006.01) |
| C22C 38/24 | (2006.01) |
| C22C 38/26 | (2006.01) |
| C22C 38/28 | (2006.01) |
| C22C 38/38 | (2006.01) |
| C23C 2/02 | (2006.01) |
| C23C 2/06 | (2006.01) |
| C23C 2/40 | (2006.01) |

(52) U.S. Cl.
CPC ......... *C21D 8/0242* (2013.01); *C21D 8/0273* (2013.01); *C21D 8/0278* (2013.01); *C21D 9/52* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/38* (2013.01); *C23C 2/02* (2013.01); *C23C 2/0224* (2022.08); *C23C 2/024* (2022.08); *C23C 2/06* (2013.01); *C23C 2/40* (2013.01); *C21D 2211/001* (2013.01); *C21D 2211/005* (2013.01); *C21D 2211/008* (2013.01)

(56) References Cited

FOREIGN PATENT DOCUMENTS

| | | | |
|---|---|---|---|
| WO | 2016001887 | A3 | 1/2016 |
| WO | 2017021464 | A1 | 2/2017 |
| WO | 2019155014 | A1 | 8/2019 |
| WO | 2019188642 | A1 | 10/2019 |

\* cited by examiner

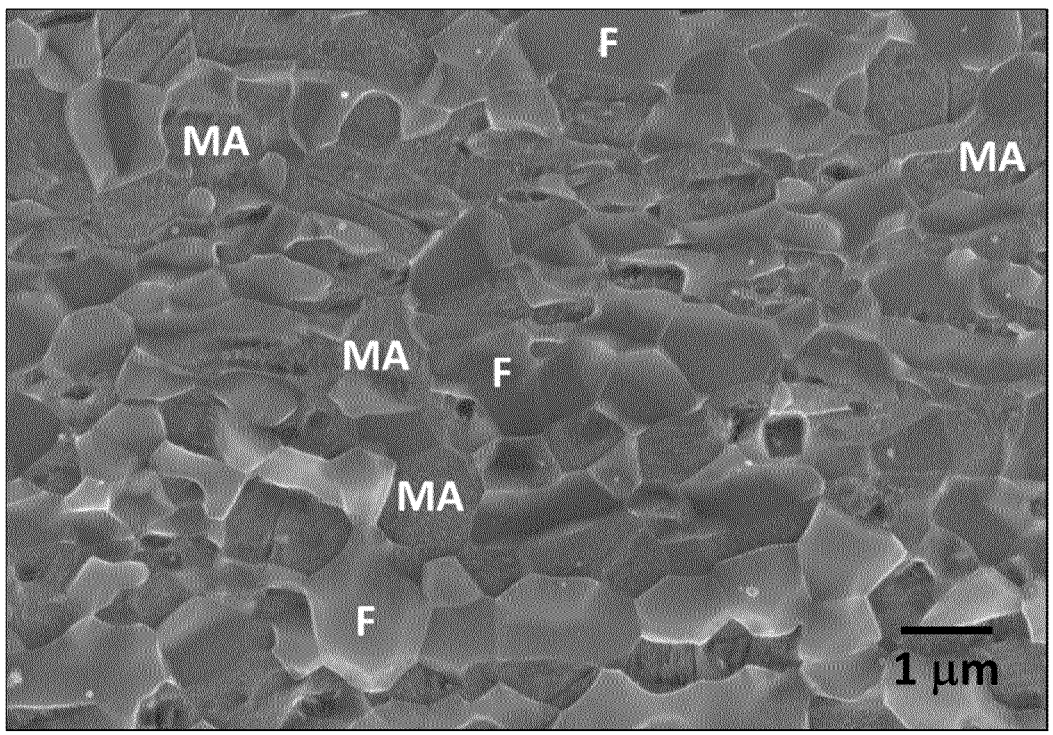

METHOD OF MAKING A COLD FORMABLE HIGH STRENGTH STEEL STRIP AND STEEL STRIP

The present invention relates to a method of making a cold formable coated or uncoated high strength steel strip for manufacturing a steel article and such a steel strip.

Cold forming or cold stamping or cold press forming of steel sheets is a method for making steel components in manufacturing industries such as automotive, construction, engineering, infrastructure etc. for various applications. It is known that cold formability of steel sheets decreases as the strength of the steel increases. This is particularly true for conventional sheet steels as well as for first generation of advanced high strength steels (AHSS).

Due to this inverse relationship of steel strength and elongation, the property map of tensile strength and elongation of these steels is sometimes referred to as a "banana diagram". However, high formability can be achieved at high strength employing so-called $2^{nd}$ generation AHSS (2GAHSS) concepts, but these steels are usually highly alloyed and also contain expensive alloying elements. Examples are high manganese-containing twinning induced plasticity (TWIP) steels where Mn content is typically higher than 12 wt. % and stainless steels that contain high amounts of expensive alloying elements such as chromium, nickel, molybdenum etc. Apart from being very expensive, another drawback of 2GAHSS is that due to their very high alloy contents, they are very difficult to manufacture in large industrial scale.

To overcome these issues of 2GAHSS but yet to achieve reasonably high cold formability at high strength, various $3^{rd}$ generation of AHSS (3GAHSS) concepts have been introduced such as quenching & partitioning (Q&P) steels, carbide-free bainitic (CFB) steels and medium Mn steels. These steels are less expensive than 2GAHSS and can be processed easily in existing facilities of steel plants. The present invention focuses on a medium Mn type of 3GAHSS.

WO16001887 discloses a method for manufacturing a high-strength steel sheet wherein the steel contains in percent by weight $0.1 \leq C \leq 0.4$, $4.2 \leq Mn \leq 8$, $1 \leq Si \leq 3$, $0.2 \leq Mo \leq 0.5$, the remainder being Fe and unavoidable impurities, the method comprising continuous annealing above Ac3, quenching to in-between martensite start (Ms) and finish (Mf) temperature, overaging at in between 300-500° C. for more than 10 s and cooling. This is essentially a quenching and partitioning (Q&P) process where C enrichment (and possibly some Mn enrichment) in austenite achieved through the overaging step of a steel containing some amount of martensite. A Q&P process is totally different from an intercritical annealing process. In this document, substantial Mn partitioning into austenite is not expected because at the lower overaging temperatures (300-500° C.) Mn diffusion in steel is extremely slow.

WO2017021464 discloses a high-tensile steel in the form of a hot or cold rolled strip, with a chemical composition (in % by weight): C: 0.005 to 0.6; Mn: 4 to 10; Al: 0.005 to 4; Si: 0.005 to 2; P: 0.001 to 0.2; S: up to 0.05; N: 0.001 to 0.3; the remainder being iron with unavoidable elemental inclusions associated with steel, wherein the steel if flexibly hot rolled, optionally annealed, flexibly cold rolled, optionally annealed end further flexibly cold rolled and subsequently annealed at an annealing temperature of 600° C. to 750° C. during 1 minute to 48 hours. This patent applies flexible rolling by controlling the roll gap where shear conditions vary across the width of the strip. Flexible rolling is a different process targeted for components with varying wall thicknesses which is different from the conventional rolling process as in the current invention where uniform product thickness over the entire width is obtained. A disadvantage of flexible rolled strip is that heterogeneous properties are obtained across the width of the strip.

The present invention aims to provide a highly cold-formable steel strip in cold rolled thicknesses in coated or uncoated condition whilst maintaining a high strength.

Another object of the invention is to provide a highly cold-formable steel strip in hot rolled thickness range in coated or uncoated condition whilst maintaining a high strength.

Both hot rolled and cold rolled steel strips of the present invention have high energy absorption capacity, that is are highly crash-resistant, are spot-weldable and resistant to hydrogen embrittlement.

The invention is firstly embodied in a method of manufacturing a cold rolled and annealed steel strip, the steel composition being in wt. %:
C: 0.05-0.3;
Mn: 3.0-12.0;
Al: 0.03-3.0;
optionally, one or more further alloying elements:
Si: less than 1.5;
Cr: less than 2.0;
V: less than 0.1;
Nb: less than 0.1;
Ti: less than 0.1;
Mo: less than 0.5;
inevitable impurities, such as
S: less than 30 ppm;
P: less than 0.04; and
the remainder being Fe;
the method comprising the steps of:
casting the molten steel into a slab:
reheating the slab and holding it at a temperature of 1150° C. or more for a time of 1 hour or more;
hot rolling the steel into a strip, preferably with an average F1 slab entry temperature of above 1000° C.;
coiling the hot rolled steel strip;
pickling the steel strip;
intermediate-batch-annealing the steel strip at a temperature lower than 650° C. for longer than 24 hours to achieve at least 60 vol. % ferrite after cooling to room temperature;
cold rolling the steel into a cold rolled steel strip and coiling it;
batch annealing the coiled steel strip:
  at an intercritical temperature between Ac1 and Ac3 which is below 700° C.;
  in a non-oxidising and non-nitrogenated atmosphere;
  the total annealing time for which the strip is kept at said intercritical temperature being at least 5 hours, preferably at least 10 hours in order to get Mn enrichment in austenite which is such that the Mn content is at least 1.25 times the bulk Mn content of the steel and C enrichment such that the C content is at least 1.2 times the bulk C content of the steel;
  cooling the steel after batch annealing in air, in forced air or by water quench.

A steel containing essentially 0.05 to 0.3 wt. % C, 3.0-12.0 wt. % Mn, 0.03-3.0 wt. % Al and optionally other alloying elements and inevitable impurities is processed to hot rolled gauge using a specific processing route. The molten steel is cast into slabs, then the slabs are reheated to a temperature of 1150° C. or higher for a time of 1 hour or more. Then, the slabs are hot rolled into strips preferably with a finish entry temperature (F1) of above 1000° C. The F1 entry temperature is the entry temperature of the strip in the first stand of a finish rolling mill. The finish rolling mill is the part of the hot rolling mill where finish rolling is performed that takes place after roughing or breakdown rolling of the slabs in the rough rolling mill and before the run-out table cooling. After it has passed the run-out table, the hot rolled strip is wound into coils, and these coils are then intermediate-batch-annealed at a temperature lower than 650° C. for at least 24 hours so that at least 60 vol. % of ferrite is achieved in the steel strip after cooling to room temperature. Then the steel strips are pickled in an acid solution at a temperature of say 50-90° C. and cold rolled to thinner gauges. The invention is not limited by the range of hot rolled or cold rolled gauges. However, typically the hot rolled gauge will be in the range of 2 to 10 mm and the cold rolled gauge in the range of 0.5 to 2 mm. Then, the cold rolled steel is batch annealed at an intercritical temperature below 700° C. preferably below 660° C., in a non-oxidising and non-nitrogenated atmosphere for a duration of at least 5 hours, preferably at least 10 hours so that the Mn content of intercritical austenite reaches at least 1.25 times the bulk Mn content of the steel and C content of intercritical austenite reaches at least 1.2 times the bulk C content. The longer period of 10 hours is preferred because a larger amount of Mn can partition into austenite from ferrite during annealing. Mn typically takes a longer time to diffuse because it is a large substitutional alloying element in iron. As the temperature of the batch annealing lowers, the manganese enrichment in the intercritical austenite increases which makes the austenite in steel more stable down to room temperature after cooling following batch annealing. The batch annealing time is defined as the period of time the steel strip kept at a said batch annealing temperature, excluding the time for heating the strip to the target temperature.

The last batch annealing, i.e. in this text the batch annealing of the coiled strip, will take place for a duration mentioned in the claim which is sufficiently long to obtain in the steel a relatively equi-axed ferrite grain morphology wherein the ratio of grain length and width is preferably 3 or smaller. Then the steel is cooled at any cooling rate to the room temperature such as in air, forced air or water.

By carrying out the method in accordance with the invention the following advantages are obtained:

The medium Mn steel containing the mentioned alloying elements together with 3-12 wt. % Mn has reduced segregation of Mn. This is a concern affecting the mechanical properties when Mn is present at relatively high amount as in this invention. The relatively high slab reheating temperature above 1150° C., preferably 1200° C., more preferably above 1250° C. and a minimum reheating time of 1 hour are chosen in order to minimise segregation and to homogeneously distribute Mn in the matrix. Otherwise, the final mechanical properties may suffer. The selection of the reheating temperature will be dependent on the Mn content of the alloy. When the Mn content of the alloy is near the lower bound of the claimed Mn range, reheating temperatures close to 1150° C. will be sufficient to homogenise the Mn distribution and as the Mn content increases higher slab reheating temperatures will be preferred.

The steel can be hot rolled at industrial scale with a reasonably large width of the strip, e.g. more than 1000 mm. This is achieved by maintaining a high F1 temperature above 1000° C. during hot rolling to keep the required hot rolling force low. With a lower F1 temperature hot rolling of the steel strip will become difficult.

The steel becomes suitable for cold rolling at an industrial scale. This becomes possible by virtue of using the intermediate-batch-annealing step for the hot-rolled steel. The intermediate-batch-annealing is carried out at the intercritical temperature of the steel preferably below 650° C. at such a selected temperature that at least 60 vol. % ferrite in the steel strip is achieved, the remainder being retained austenite and martensite.

The (further) batch annealing of the coiled steel strip below 700° C. actually creates the right microstructure. It should be at least 5 hours, preferably at least 10 hours. During this process step, Mn and C of the inventive steel partition between intercritical austenite and ferrite so that austenite becomes highly enriched by Mn and C and makes the phase stable until room temperature. Since the austenite is enriched such that the Mn content is at least 1.25 times the bulk Mn content of the steel and the C content is at least 1.2 times the bulk C content of the steel, the steel becomes virtually insensitive to practical cooling rates and therefore the steel can be cooled in air, forced air or water after batch annealing. The lower the batch annealing temperature is below 700° C., the richer is the intercritical austenite in Mn content.

A second embodiment of the invention is a method of manufacturing a hot rolled and annealed steel strip, the steel composition being in wt. %:

C: 0.05-0.3;
Mn: 3.0-12.0;
Al: 0.03-3.0;
optionally one or more further alloying elements:
Si: less than 1.5;
Cr: less than 2.0;
V: less than 0.1;
Nb: less than 0.1;
Ti: less than 0.1;
Mo: less than 0.5;
inevitable impurities, such as
S: less than 30 ppm;
P: less than 0.04; and
the remainder being Fe;
the method comprising the steps of:
casting the molten steel into a slab;
reheating the slab at a temperature of 1150° C. or more, for a time of 1 hour or more;
hot rolling the steel into a strip, preferably with an average F1 slab entry temperature of above 1000° C.;
coiling the hot rolled steel strip;
pickling the steel strip;
batch annealing the coiled steel strip:
  at an intercritical temperature between Ac1 and Ac3 which is below 700° C.;
  in a non-oxidising and non-nitrogenated atmosphere;
  the total annealing time for which the strip is kept at said intercritical temperature being at least 5 hours, preferably at least 10 hours in order to get Mn enrichment in austenite such that the Mn content is at least 1.25 times the bulk Mn content of the steel and C enrichment such that the C content is at least 1.2 times the bulk C content of the steel;
cooling the steel after batch annealing in air, in forced air or by water quench.

The steel processed according to the first embodiment up to the hot rolling step, as described above, is then directly subjected to the final batch annealing step after pickling skipping the intermediate steps. The batch annealing will take place according to the claim, for a sufficiently long period to obtain in the steel a relatively equi-axed ferrite grain morphology wherein the ratio of grain length and width is preferably 3 or smaller.

The steel is thus manufactured as a hot rolled strip instead of a cold rolled strip however with all the advantages in terms of mechanical properties as the cold rolled strip under the first embodiment.

The invention is also embodied in a method wherein reheating the slab is at a temperature of 1200° C. or more. This achieves better homogenisation of Mn in the as-cast steel slabs reducing its segregation.

The invention is also embodied in a method wherein reheating the slab is at a temperature of 1250° C. or more. This achieves even further reduction in any micro-segregation of Mn present in the as-cast steel slabs.

The invention is also embodied in a method wherein batch annealing the coiled steel strip takes place at an intercritical temperature below 660° C. This achieves a higher enrichment of Mn in the intercritical austenite so that the martensite content in the final microstructure can be minimised. The invention is also embodied in a method wherein the resulting strip is coated with any metallic coating applied by hot dip galvanising, galvannealing, electro-galvanising, aluminising or any other method such as physical vapour deposition (PVD), chemical vapour deposition (CVD). This achieves the required corrosion resistance and good aesthetic appearance of the steel strip in application or service.

In an embodiment in the method according to the claims except claim 2, the resulting steel strip undergoes skin pass rolling, also known as temper rolling. This even further improves the cold formability properties.

In an embodiment skin pass rolling takes place with a thickness reduction of 5% or less. This minimises the yield point elongation of the steel strip in a tensile test, thereby improving the cold-formability and the aesthetic appearance of the cold-formed steel strip.

The invention is also embodied in a steel strip that may be or is manufactured according to the method of the first or second embodiment of the invention, wherein the steel strip has a steel composition being in wt. %:
C: 0.05-0.3;
Mn: 3.0-12.0;
Al: 0.03-3.0;
optionally one or more further alloying elements:
Si: less than 1.5;
Cr: less than 2.0;
V: less than 0.1;
Nb: less than 0.1;
Ti: less than 0.1;
Mo: less than 0.5;
inevitable impurities, such as
S: less than 30 ppm;
P: less than 0.04; and
the remainder being Fe;
wherein the steel strip has a retained austenite composition that has a Mn content that is at least 1.4 times the bulk Mn content of the steel composition as well as a C content that is at least 2.3 times the bulk C content of the steel composition, in order to obtain metastable retained austenite to give the steel a high strain hardening exponent of at least 0.3 measured after yield point elongation for a strain range of 7% in a quasi-static tensile test, wherein the microstructure after final batch annealing of the coiled steel strip comprises in vol. %:
ferrite: 30-70%;
retained austenite: 20-65%;
martensite: <20%, including 0 vol. %.

The steel strip has a level of Mn and C enrichment in the metastable austenite of the final microstructure of the steel in the final use condition to give it a high work hardening or strain hardening rate.

Further, according to the invention, the cold rolled or the hot rolled steel strips preferably have a microstructure wherein there is retained austenite in the range of 20 to 65 vol. %, ferrite in the range of 30 to 70 vol. % and martensite which is present below 20 vol. %, including 0 vol. %. The ferrite is preferably ultrafine with a grain size in the range of 0.2 to 2 μm. This ultrafine ferrite due to sufficiently long batch annealing of the coiled steel strip acquires a more or less equi-axed shape, with a length/width ratio of the grains ≤3. As opposed to in continuous-type annealing which is typically short (in minutes rather than in hours) yielding elongated shape of grains with high aspect ratio (length/width ratio), during long batch annealing of the cold-rolled strips employed in this invention sufficient recrystallization of the ferrite grains take place.

The other embodiments of the invention are according to claims 10 to 14 which give the high mechanical and cold formability properties achieved in the steel strips when manufactured according to the invention. These properties are (biaxial) stretchability, bendability, hole expansion capacity, yield strength, ultimate tensile strength, total elongation and yield point elongation.

The invention is also embodied in a steel strip having undergone skin pass rolling, also known as temper rolling, as described above.

The invention is based on modification of the composition of the steel and processing it using all the mentioned steps to achieve the optimised microstructure. Due to the achieved microstructure, the steel strip in cold rolled and/or hot rolled form has high cold formability and high mechanical properties.

The essential elements for the steel are Mn, C and Al. Mn and C are austenite stabilising elements in steel and therefore these are added to the steel in predetermined amounts to stabilise austenite. Al is a ferrite stabiliser, but it widens the temperature range between Ac1 and Ac3 (Ac1=the temperature at which austenite transformation starts during heating; Ac3=the temperature at which austenite transformation completes during heating). Al is added to increase the robustness of the steel to industrial processing as it makes the steel less sensitive to undesired small temperature variations during intercritical processing. The invention is non-limiting to the presence of other optional elements and inevitable impurities present in steel. The ranges of these optional and inevitable alloying elements are given in the relevant claims.

The elevated amount of Mn in the steel, in the range of 3 to 12 wt. %, will cause a high amount of Mn enrichment in austenite during the batch annealing of the as-coiled hot or cold rolled steel strip. This Mn enrichment, together with the C enrichment since C is also an austenite stabilising element, increases the thermal stability of the intercritical austenite by suppressing the Ms temperature of the steel (Ms=the temperature at which martensite transformation starts during cooling). Therefore, during cooling to room temperature after the batch annealing of the coiled steel strip the intercritical austenite does not transform to martensite to a great extent so that a high amount of austenite (>20 vol. %) can be retained at room temperature microstructure of the steel. This retained austenite with optimum mechanical stability transforms to martensite during loading (forming or any other deformation) causing a transformation induced plasticity (TRIP) effect. High strength, high elongation and high cold-formability in the steel strips of the invention are achieved in the product because of the TRIP effect that increases the work or strain hardening rate. A Mn content higher than 12 wt. % will cause continuous casting of the steel to be difficult due to extreme segregation as well as the mechanism of plasticity enhancement will change from TRIP to TWIP (TWIP=twinning induced plasticity), and a content lower than 3 wt. % will not give enough Mn enrichment in austenite to achieve sufficient amounts of retained austenite at room temperature microstructure.

Similar to the effects of Mn as described above, C also partitions into the intercritical austenite during the final batch annealing, increases the thermal stability of austenite and causes austenite stabilisation at room temperature microstructure. However, C is effective in smaller amounts than Mn and therefore the range of C content for modifying the steel chemistry in the present invention is 0.05 to 0.3 wt. %. If the C content is below 0.05 wt. %, sufficient austenite stabilisation effect is not obtained, and a C content above 0.3 wt. % will cause post processing the manufactured strip after cold forming such as spot welding difficult. Welding is essential in assembling the automotive components into the autobody and therefore it is very important to consider this aspect. C is also added to the steel in the present invention to increase the strength.

Aluminium is not an austenite stabilising element in steel, rather a ferrite stabilising element. However, it is added to the steel up to 3 wt. % to enlarge the intercritical temperature range (Ac1 to Ac3) of the steel. With a high level of Mn, the steel becomes sensitive to small variations in processing temperature in industrial scale processing. Addition of Al ensures the process robustness of the steel so that the batch annealing temperature of the steel strips can be selected with small variations to achieve desired microstructures. When no Al is added deliberately as an alloying element to the steel (i.e. when the Al content is about 0.03 wt. % as it is often added as a deoxidiser to molten steel) more accurate furnaces are necessary to be employed but still the invention will work. The highest amount of Al is limited to 3 wt. % to reduce oxide scale formation during hot rolling and the rolling forces during hot and cold rolling.

The combination of the composition of the steel and the steps of the method leads to the beneficial effects of the invention. Mn, which is an essential alloying element for modification of the steel chemistry, has a tendency to segregate after casting when its content is above about 2 wt. %. This will affect the product performance by giving inhomogeneous properties and can also lead to cracking during processing steps. Therefore, it is preferred that the cast slabs are homogenised well. Good homogenisation of the slabs is achieved by using relatively high slab reheating temperatures above 1150° C., preferably above 1200° C., more preferably above 1250° C. and for long enough time, preferably for 60 minutes or more.

Then, due to relatively high alloy content of the steel, rolling forces are high during hot rolling of the strips. To roll reasonably wide strips at an industrial scale, typically wider than 1000 mm, hot rolling is preferably carried out at relatively high temperatures in the austenitic phase of the steel, above Ar3 where Ar3 is the temperature at which ferrite starts to form in the steel during cooling. This can be ensured by using a start finish rolling temperature (F1) of around 1000° C. or higher. A lower F1 temperature than this may increase the hot rolling force and will lead to intercritical hot rolling which may make hot rolling difficult for industrial large scale processing. Apart from increasing the rolling force, an intercritical hot rolling may also cause insufficient recrystallisation of the hot-rolled strip.

Then, when cold rolling is applied on the hot rolled strips to reduce the gauge of the final steel product, it will not be possible to cold roll the material unless a proper pre-processing is adopted. In particular, the as-coiled steel after hot rolling is subjected to an intermediate-batch-annealing treatment for 24 hours or longer at a temperature low in the intercritical temperature range of the steel. Since it is for a relatively long time period, it is a batch-type annealing. The intermediate-batch-annealing temperature should be lower than 650° C. because at a temperature higher than this high amounts of retained austenite will form after cooling the steel to room temperature. Also, high amounts of martensite may appear in the microstructure if a higher batch annealing temperature is used. Both the martensite and retained austenite make cold rolling difficult by increasing the rolling force. While the martensite phase is hard, the retained austenite transforms to hard martensite during cold rolling itself increasing the rolling force. Therefore, an intermediate-batch-annealing of the as-coiled material is part of the method according to this embodiment, to keep the contents of retained austenite and martensite to a lower value and increase the amount of ferrite. The ferrite phase does not give work hardening during cold rolling as high as retained austenite and therefore keeps the rolling force low, making cold rolling possible. The minimum required amount of ferrite phase after this batch-type annealing of the hot rolled steel to make it amenable to cold rolling is 60 vol.

The final batch annealing of the hot rolled steel strip—in case of a hot rolled product- or the cold rolled steel strip-in case of a cold rolled product—is very critical to obtain the desired microstructural components in the final product for the invention to work. This final batch annealing must be carried out at an intercritical temperature (in the range of Ac1 to Ac3) below 700° C., preferably below 660° C. It is because thermodynamic calculations suggest that for the invented steel chemistry range, below 660° C. the peak enrichment of C in intercritical austenite takes place whereas Mn enrichment increases monotonically with lowering the temperature from 700° C. Thus, with a final batch annealing temperature below 660° C., the optimally maximum (C+Mn) enrichment is ensured in the intercritical austenite. The annealing temperature must be selected in such a manner that maximum amounts of Mn and C partitioning take place into austenite. During this final batch annealing at an intercritical temperature, there will be C and Mn enrichment in the intercritical austenite, because C and Mn are austenite stabilisers. While C diffuses fast to partition since it is a small interstitial element in steel, Mn being a large substitutional element is slow to diffuse. Therefore, a batch annealing time of preferably 5 hours or longer, more preferably 10 hours or longer is needed to achieve a high amount of Mn in the austenite. The Mn enrichment in austenite should be such that the Mn content is at least 1.25 times the bulk Mn content of the steel, preferably at least 1.4 times. The C enrichment should be such that the C content is at least 1.2 times the bulk C content of the steel, preferably at least 2.3 times. These levels of Mn and C enrichment in intercritical austenite are needed to stabilise the austenite properly to the room temperature so that at least 20 vol. % retained austenite is obtained in the room temperature microstructure. Also, these levels of Mn and C enrichment are necessary to achieve the optimum mechanical stability of the retained austenite (termed as metastability) so that during deformation the steel can have a strain hardening exponent of at least 0.3. If Mn and C enrichments in austenite are lower than the mentioned values, the optimum stability of retained austenite is not achieved and therefore the minimum 0.3 strain hardening exponent is also not achieved. Thus, when annealing duration is shorter than 5 hours, these requirements for the invention are not met. If a batch annealing temperature higher than 700° C. is used, similar drawbacks will appear. There will not be the required C and Mn enrichments in intercritical austenite and therefore intercritical austenite will not be stable enough to give a minimum of 20 vol. % retained austenite at room temperature microstructure after batch annealing combined with the required metastability for the desired high strain hardening rate. Therefore, a combination of high fractions of retained austenite and its optimum mechanical stability leads to the desired high strain hardening rate. An annealing temperature higher than 700° C. will also lead to more than 20 vol. % of martensite which will not give the desired strain hardening rate. It is this high strain hardening rate that leads to high cold formability as well as the high combination of strength ad ductility of the final product. The high strain hardening rate strengthens the steel sheet while thinning during forming (e.g. by stretching) that leads to high cold formability.

The final batch annealing is carried out in a non-oxidising and non-nitrogenated atmosphere to minimise any surface degradation of the steel strips due to oxygen and nitrogen. Since a minimum of 5 hours are required as batch annealing duration, the steel surface may oxidise if a non-oxidising atmosphere is not used. Also, decarburisation will take place, decreasing the C content of the steel, making the invention less effective. Due to the same reason, a nitrogen can react with Al present in the steel surface forming its nitrides on the steel surface. All these forms of surface degradation are detrimental to mechanical properties and formability of the steel. Preferred annealing atmospheres can be vacuum, hydrogen or argon atmospheres.

The above modifications to the steel and its processing lead to the appropriate microstructure in the final products for the invention to be successful. High fractions of retained austenite (>20 vol. %), with low fractions of martensite (<20 vol. %) and optimum fractions of ferrite (30-70 vol. %) give the combination of high strength, ductility and formability due to high strain hardening rate. A retained austenite content above 65 vol. % cannot be achieved within the composition boundaries of the steel and is also not necessary to achieve the minimum required strain hardening rate. Furthermore, higher than 70 vol. % of retained austenite may also cause problems in spot welding causing severe liquid metal embrittlement as well as poor hydrogen embrittlement resistance in service. Thus, the composition boundaries of the inventive steels have been chosen considering these factors. If ferrite content is above 70 vol. %, the high strain hardening exponent of minimum 0.3 will not be achieved which largely comes from the metastable retained austenite through the TRIP effect. Ferrite fraction below 30 vol. % is not needed to obtain the minimum strain hardening rate. Martensite phase contributes mainly to strength but not much to strain hardening rate. Furthermore, high amounts of martensite (>20 vol. %) can create weak interfaces with softer phases such as ferrite and retained austenite. These interfaces are detrimental for high ductility and formability since these act as nucleation sites for damage initiation. Therefore, martensite content should be kept below 20 vol. %, including no martensite present.

The ultrafine grain size is another microstructural requirement for the invention. The ferrite grain size should be below 2 μm, in the range of 0.2-2 μm. This ultrafine grain size gives good ductility to the product and also causes strengthening through grain refinement contributing to the good mechanical properties of the steel strips in the invention. This ultrafine microstructure is also ensured by selecting the low final batch annealing temperature, below 700° C. that restricts grain growth. Furthermore, because of the inventive steel composition and the requirement of intercritical final batch annealing the phases at the annealing temperature (ferrite and austenite) are under constraint by each other and cannot grow. All these factors lead to the desired ultrafine grain size of ferrite. A larger than 2 μm ferrite grain size will cause lower strength and ductility. The grain size is expressed here mainly by the length of the grain. Due to sufficient recrystallisation of the steel strip during final batch annealing, the width of the ferrite grain will be more than ⅓ of the length. This will actually give the relative equi-axed shape of the ferrite grains after the final batch annealing.

An effect in terms of sheet formability of the above ultrafine ferrite grain size could be the appearance of yield point elongation in the engineering stress-strain curve of the products. This can be detrimental to the cold formability of the steel due to strain localisation as well as degradation of the aesthetic appearance of the cold formed components. Therefore, the process variables were selected in such a manner that the ferrite fraction in the final microstructure is 70 vol. % at maximum. This will ensure that the yield point elongation, if present, will be limited to maximum 10% engineering strain to obtain the best sheet formability and/or aesthetic appearance of the cold-formed components. However, a yield point elongation greater than 10% engineering strain is not a limiting factor for this invention to work. This is because by a temper rolling prior to forming and/or with proper lubrication during forming, the potential negative effects of the yield point elongation can be mitigated.

To remove the yield point elongation, if present, the steel strips are given in this invention optionally a small amount of cold rolling reduction, by temper rolling or skin pass rolling, with a thickness reduction of up to 5%. This small amount of cold rolling applied in one or more passes will eliminate the yield point elongation without changing the mechanical properties of the steel strips to any appreciable extent. However, the invention still works to give high cold formability without this temper rolling step even if yield point elongation is present amounting to less than 10% engineering strain.

Optionally, the hot rolled or the cold rolled strips after their final batch annealing are coated by a metallic coating to increase their aesthetic appearance and corrosion resistance in service. The coating process can be, but not limited to, hot dip galvanising, galvannealing, electro-galvanising, PVD, CVD, etc. The final batch annealed steel strip is very robust in terms of its microstructure and therefore does not essentially change its characteristics due to the application of a thin coating.

Cold forming of the steel strips or sheets or blanks can be carried out with or without application of suitable lubrication to reduce the frictional force between the steel and the tools. In both cases, the invention provides high cold formability. Non-limitative examples of lubrication systems are light oil, Klüber Press Pate, Teflon foil or combinations of these.

The steel that is used in the method according to the invention is a medium Mn steel that comprises as main constituents carbon, manganese and aluminium. Optionally other alloying elements selected from silicon, chromium, vanadium, niobium, titanium and molybdenum may be present. Inevitable impurities like N, P, S, O, Cu, Ni, Sn, Sb etc. (originating from the starting materials for preparing the steel composition) may be present. They are not added on purpose or specifically controlled within predetermined limits. The balance of the steel composition is iron.

Carbon is present in an amount of 0.05-0.3 wt. %, such as 0.05-0.20 wt. %, preferably 0.07-0.20 wt. %. It is added mainly in view of strength, although C also contributes to stabilizing austenite. In the present composition the austenite stabilizing effect of manganese is much more pronounced due to its higher proportion. A preferred range for C is 0.05-0.25, and a more preferred range is 0.08-0.21 wt. %. Too little C will not give the desired strength level of 800 MPa, and if C is higher than 0.21, weldability of the formed parts might become poor.

Manganese is present in an amount of 3.0-12.0 wt. %. Manganese reduces the Ac1 and Ac3 temperatures, stabilizes austenite, increases strength and toughness, and causes the TRIP effect by stabilizing austenite at room temperature microstructure. At levels below 3.1 wt. % the effects aimed for are not achieved, while at amounts above 10.5 wt. % problems in casting and segregation will be caused. Also, the deformation mechanism would change from transformation induced plasticity (TRIP) to twinning induced plasticity (TWIP). If the Mn content is too low, then insufficient austenite will be retained at room temperature and the stability of the retained austenite will be too low with the result that no ductility and strain hardening benefit can be obtained. Preferably the Mn content is in the range of 3.5-10.0 wt. %. In an embodiment Mn amounts to 5.0-9.0 wt. %. In other embodiments it is 5.5-8.5 wt. %, such as 6.0-7.5 wt. %.

Aluminium is added to expand the temperature range Ac1 to Ac3 to increase the robustness of the process in view of industrial application. Al is present in an amount from 0.03 and up to 3.0 wt. %, such as 0.6-2.9 wt. %, preferably in the range of 1.0-2.2 wt. %.

Silicon, if present, is added in an amount of less than 1.5 wt. % for increasing strength by solid solution strengthening. If present, the amount is typically more than 0.01 wt. % and less than 1.5 wt. %. Its preferred range is 0.1-1.0 wt. %.

Al and Si contribute both to suppress cementite precipitation to avoid deterioration of ductility. Furthermore, both Al and Si also increase the peak annealing temperature for obtaining the highest amount of retained austenite at room temperature after the final batch annealing. Therefore, during intercritical annealing the diffusion of Mn is facilitated to have effective Mn partitioning in austenite.

One or more further micro-alloying elements, selected from the group V, Nb, Ti and Mo, are optionally present. These micro-alloying elements increase the strength through precipitation hardening by their carbides, nitrides or carbonitrides. Cr, another optional element for this invention, also increases the peak annealing temperature for achieving highest amount of retained austenite at room temperature and reduces the sensitivity of the content of retained austenite with annealing temperature. These result in effective Mn partitioning in austenite and increased process robustness during annealing. If present, the preferred additions of these optional alloying elements are: V: 0.01-0.1 wt. %; and/or Nb: 0.01-0.1 wt. %; and/or Ti: 0.01-0.1 wt. %; and/or Mo: 0.05-0.5 wt. %; and/or Cr: 0.1-2.0 wt. %.

The composition of the metallic coating is not limited. Zn-based coatings may be applied, such as zinc containing essentially zinc, at least 0.1 wt. % Al, and optionally up to 5 wt. % Al and up to 4 wt. % Mg, the rest of the coating composition comprising further elements all individually less than 0.3 wt. %, and unavoidable impurities. Other additional elements that may be present in a small amount of less than 0.3 wt. %, e.g. in order to form spangles and/or to prevent dross forming, could be selected from the group comprising Pb, Sb, Ti, Ca, Mn, Sn, La, Ce, Cr, Ni, Zr and Bi. Pb, Sn, Bi and Sb. Small amounts of such additional elements do not alter the properties of the bath or the resulting coating to any significant extent for the usual applications. Preferably, when one or more additional elements are present in the coating, each is present in an amount <0.02 wt. %, preferably each is present in an amount <0.01 wt. %. Coating method can also vary from hot dip galvanising (GI), galvannealing, heat-to-coat cycles, electro-galvanising. Aluminium-based coating can also be applied such as Al—Si—X coatings where Si can vary from 0.1 to 10 wt. % and X=any other coating modifying element present in any required amount, plus inevitable impurities that do not essentially change the coating characteristics. Coating methods such as PVD, CVD etc. are also applicable.

The final batch annealing procedure is not limited by the type of furnace used or even the heating rate and cooling rates of the strip in the coil. It is understood that the heating rate of a coil may vary from surface to centre when subjecting them to batch annealing. But for this invention, it is essential that the coiled strip is at the target batch annealing temperature for a minimum of 5 hours, preferably more than 10 hours so that every part of the coil experiences sufficient C and Mn enrichment in austenite. Cooling rate after batch annealing is irrelevant for the invention since the presence of high amounts of Mn increases the hardenability of the steel. Thus, the coil can be cooled inside the batch annealing furnace, air cooled, forced air cooled or even water quenched.

The temper rolling or the skin pass rolling can be done either on the bare steel strip or on the coated steel strip. It is also can be done in single pass or in multiple pass.

The obtained steel strip preferably has a triplex or duplex microstructure comprising (in vol.
- ferrite: 30-70%;
- retained austenite: 20-65%;
- martensite: less than 20%, including 0%; and
- ferrite grain size: 0.2-2 μm.

The obtained steel strip has the following composition features of the retained austenite:
- Mn: 1.25 times the bulk Mn composition of the steel, preferably 1.4 times
- C: 1.2 times the bulk C composition of the steel, preferably 2.3 times Advantageously the steel strip has the following properties:
- yield strength: 600 MPa or more;
- ultimate tensile strength: 800 MPa or more;
- total elongation: 20% or more;
- strain hardening exponent: 0.3 or more
- yield point elongation: preferably 10% engineering strain or less
- minimum bending angle at 1.0 mm thickness: 1000 or more;
- hole expansion capacity: 20% or more;
- minimum stretching strain in bi-axial stretching: 10% or more.

The phase fractions mentioned above were determined by using X-ray diffraction (XRD). The amount of retained austenite was determined by XRD at ¼ thickness location of the samples. The XRD patterns were recorded in the range of 45 to 165° (2 Θ) on a Panalytical Xpert PRO standard powder diffractometer ($CoK_\alpha$-radiation). Quantitative determination of phase proportions was performed by Rietveld analysis using Bruker Topas software package for Rietveld refinement. Martensite content was determined from the peak-split at the ferrite diffraction locations in the diffractograms.

The grain size of the phases was determined from scanning electron microscope (SEM) images of the microstructure. The Mn concentration of retained austenite was determined by an electron probe microanalyser (EPMA). The C content of retained austenite was estimated by well-known formula proposed by Dyson and Holmes. This formula relates the lattice parameter of austenite, which can be determined from the XRD data, with its C content. This formula can be obtained in the following article:

D. J. Dyson, B. Holmes, Effect of alloying additions on the lattice parameter of austenite. Journal of Iron Steel Institute, vol. 208, year 1970, pages 469-474.

The yield strength, ultimate tensile strength, yield point elongation and total elongation were determined from quasistatic (strain rate $3 \times 10^{-4}$ $s^{-1}$) tensile tests at room temperature according to NEN10002 standard. The geometry of the tensile specimens consisted in 80 mm gauge length in the rolling direction, 30 mm width and a nominal thickness of 1.5 mm. The strain hardening rate was measured in a range of 7% strain after the yield point elongation in the tensile curve. The bendability was determined by three-point bending tests following VDA 238-100 standard on nominally 1.5 mm thick, 40 mm×30 mm specimens in both longitudinal and transverse directions. The bending axis was along the 30 mm dimension and the bending radius was 0.4 mm. The bending angles obtained from the nominally 1.5 mm specimens were converted to the angles corresponding to 1.0 mm thickness using the following formula: bending angle at 1.0 mm thickness=measured angle x square root of actual thickness in mm. From these converted bending angles, for a specific heat treatment condition the lowest value of the longitudinal and the transverse specimens was taken to claim the ranges in this invention. Hole expansion capacity (HEC) was determined according to ISO/TS 16630:2003(E) standard. Specimens of dimension 90 mm×90 mm×1.5 mm were cut from the steel strips. A hole of 10 mm diameter was punched in the middle of the specimens, and the hole expansion tests were carried out. The hole expansion capacity (HEC=(expansion of the initial diameter of the hole/initial diameter of the hole)×100%) was calculated from the measured data. The biaxial stretching strains were determined from biaxial stretching tests performed on the Erichsen press using a 75 mm diameter flat punch in combination with a 79.78 mm diameter die. The punch nose has a radius of 10 mm and the die of 8 mm. The blank holder force was set to the maximum machine capacity (~580 kN) to ensure no draw-in would occur. The test speed was set at 20 mm/min. The strain measurement was done by applying a 10 mm square grid on the sheets with a fine marker.

In manufacturing the steel strip, by using a final batch annealing step at the intercritical temperature of the steel below 700° C. as explained above, Mn partitioning from ferrite to austenite occurs increasing the stability of the intercritical austenite. During cooling after the final batch annealing the intercritical austenite does not transform significantly to martensite because of its high stability due to the low Ms, giving a duplex microstructure of ferrite and retained austenite. For low Mn contents, e.g. below 8 wt. %, some intercritical austenite may transform to martensite, but the martensite content will be 20 vol. % or less. Therefore, by enhanced levels of Mn and a low batch annealing temperature (e.g. less than 700° C.), a high amount of retained austenite (20 vol. % or more) with optimum metastability can be guaranteed. This high amount of retained austenite partially transforms to martensite during deformation in the shaping step, causing a transformation induced plasticity (TRIP) effect giving rise to a high strain hardening exponent (=high elongation and high formability).

The total elongation of the steel strip is preferably 20% or more and the strain hardening exponent is 0.3 or more because of the steel composition. An intercritical batch annealing step of a medium Mn steel approach is preferably used to obtain a mixed microstructure of ultrafine ferrite (0.5-2.0 micron) and areas of martensite and high retained austenite. Therefore, the high ductility and high hardening rate is obtained. These lead to high cold formability of the steel strip.

A preferred steel strip is used as a material to manufacture an automotive component, in particular those having complex shapes requiring formability of the strip. The components requiring high energy absorption combined with high strength are also suitable to manufacture from the steel strip. Non-limiting examples include inner parts of car, B-pillars and longitudinal bars etc.

The invention will be elucidated with reference to FIG. 1 and the examples described below.

FIG. 1 shows a SEM microstructure of a steel manufactured according to this invention obtained by final batch annealing (steel A, 650° C./10 hours) wherein F=ferrite, MA=martensite-austenite.

Steel ingots of the three inventive chemistries A, B and C of dimensions, 200 mm×100 mm×100 mm were cast by melting the charges in a vacuum induction furnace. The chemical compositions of these inventive steel chemistries along with two reference steels D and E are given in Table 1. Steel D is a twinning induced plasticity (TWIP) steel and steel E is a DH1000 grade, both received in their final cold rolled and annealed condition. The thicknesses of these as-received steels were 1.7 mm and 1.5 mm respectively. Then they were reheated for 2 hours at 1250° C., and rough-rolled to 30 mm thickness. Then, the strips were reheated again at 1250° C. for 30 minutes, and hot rolled to 3 mm thickness for steels A and B and to 4 mm thickness for steel C with a rolling start temperature of 1150° C. and a finish rolling temperature (FRT) of 900° C. which is in the austenitic phase field for all the three steels. The high reheating temperature of 1250° C. and the long duration of 2 hours were used for proper homogenisation of Mn.

The austenite to ferrite transformation temperature (Ar3) for steels A, B and C were measured by dilatometry to be 785, 770 and 723° C. respectively. Then, the hot rolled steels were subjected to coil cooling simulations from 680° C. in a muffle furnace and thereby cooled to the room temperature. Then the hot rolled strips of A and B were intermediate-batch-annealed for 96 hours at 600° C., whereas strips of C were intermediate-batch-annealed at 550° C. in a muffle furnace under protective atmosphere of argon and air cooled to room temperature. These annealing temperatures were selected in such a way that desired amounts of ferrite fractions were achieved to facilitate in the cold rolling later in the process. The phase fractions of the steels A, B and C after this intermediate-batch-annealing of the hot rolled strips are given in Table 2. The phase fractions were determined from the quarter thickness locations of the strips by XRD measurements as described before. It is seen that the ferrite fractions in all the three steels were higher than 60 vol. %.

Next, the strips were pickled in HCl acid at 90° C. to remove the oxides, and then all the steels were cold rolled to a final thickness of 1.5 mm from their respective hot rolled gauges.

The cold rolled strips of A and B were batch-annealed at 650° C. for 10 hours and that of steel C at 640° C. for 4 and 16 hours using muffle furnace. Argon atmosphere was used for annealing so that the atmosphere did not contain oxygen and nitrogen to minimise the oxidation of the strips and any unwanted reaction between nitrogen from the atmosphere and aluminium from the steel to form nitride layers on the surface. After annealing, the samples were air cooled to room temperature. For comparison, cold rolled strips of A was also annealed similar way at 650° C. for 2 minutes, 5 minutes and 1 hour, and C at 640° C. for 4 hours. Some of the specimens were given a skin pass rolling or temper rolling of up to 5% thickness reduction.

The procedures for material characterisation and testing have been described above. To recall, the microstructure of the samples was characterised using XRD and SEM. Microanalysis for phase chemistry was done by EPMA and XRD analysis. Tensile properties were determined by tensile testing of specimens with 80 mm gauge length and 30 mm width (A80 specimen geometry). Formability of the strips was evaluated by bending, hole expansion and biaxial stretching tests using suitable lubrications. For bendability, the definitions of L and T specimens are as follows: L=longitudinal specimen where bending axis is parallel to the rolling direction, T=transversal specimen where bending axis is perpendicular to the rolling direction.

A typical microstructure obtained after the final batch annealing of the cold rolled strips of steel A is shown in FIG. 1 where ferrite and martensite-austenite areas can be observed.

Also, the grain size of ferrite can be realised which is ultrafine. The microstructural characteristics of steels A, B and C after different final annealing treatments of the cold rolled samples are provided. For all the steels in all conditions, the grain size of ferrite is in the range of 0.5 to 1.9 μm. For steels A and C, the retained austenite content increases as the annealing time increases at their respective annealing temperatures due to more Mn partitioning into austenite. The retained austenite content was also higher with higher Mn content (steel C has higher retained austenite than A and B) showing the effects of Mn on austenite stabilisation. In all the conditions, high fractions of retained austenite were obtained (above 33 vol. %) except for steel A annealed for 2 minutes at 650° C. Mn and C contents of the annealing conditions of the steels which are given in Table 4 show that in the retained austenite of all these different conditions of steels Mn enrichment ranges from 1.286 to 2.139 times the bulk Mn contents of the steels except for steel A-650° C./2 min condition where Mn content is only 1.09 times the bulk Mn content. For C enrichment in retained austenite, the C contents ranges from 1.17 to 3.085 times the bulk C content of the steels, except for steel A-650° C./2 min condition where this value is 1.063 times. Due to these low C and Mn enrichments in austenite, the retained austenite content of steel A-650° C./2 min condition is also lower than 20 vol. %, and consequently the martensite content is higher than 20 vol. % (39.8 vol. %). In all other inventive steels and conditions, the martensite content is 16.7 vol. % or lower including 0 vol. % (steel C-640° C./960 min).

The lower retained austenite fraction for steel A-650° C./2 min condition is clearly due to the fact that annealing time of 2 min was too short for enough Mn diffusion into austenite even though the annealing temperature was in the intercritical temperature range of steel A and below 700° C.

The consequence of the above microstructural features can be observed in the tensile properties of the steels given in Table 5. Steel A-650° C./2 min which got lower amounts of retained austenite and lower than 1.25 times Mn and 2 times C of its bulk Mn and C contents respectively exhibited very high yield strength and ultimate tensile strength but a total elongation of only 3.1%. This is because during tensile test, all its retained austenite transforms very quickly to martensite because of its low stability envisaged by low Mn and C enrichment. The small amount of retained austenite is consumed very early during deformation without even showing any yield point elongation. Thus, the tensile properties of this steel condition are poor and not usable for cold forming. On the other hand, steel A in other annealed conditions and steels B and C in all conditions showed yield strength higher than 693 MPa, ultimate tensile strength higher than 860 MPa and total elongation higher than 23.4%. These steels also showed high energy absorption capacity (determined by the product of ultimate tensile strength and total elongation) and various amounts of yield point elongation. The yield point elongation decreased with annealing time for steel A and C due to increase in ferrite grain size as seen from Table 3. The tensile properties of these inventive steel compositions can be compared with the reference steels listed in Table 6. The inventive steel chemistries in long final batch annealed conditions have much higher total elongation as well as energy absorption capacity than the conventional DH1000 grade (reference steel E) because of the steel chemistry-processing-microstructure combination. Steel E has very low amount of retained austenite in its microstructure. Furthermore, although TWIP steel (reference steel D) has much higher total elongation than the inventive steels, the energy absorption capacity of some of the inventive steels are in the range of TWIP steel which has a fully austenitic microstructure.

The formability parameters of the inventive steels are shown in Table 7 comparing with the reference steels. The formability parameters compared are biaxial stretchability in terms strains in rolling and transverse directions, bendability in sheet longitudinal and perpendicular directions and flangeability as expressed by HEC values. Steel A shows that when final batch annealing is performed shorter than 10 hours at 650° C., the biaxial stretching strain values are 0, although the other parameters are non-zero. Steel A annealed at 650° C. for 2 minutes showed very poor bendability and flangeability as well. Although bendability and flangeability improve with increasing annealing time, the material is not stretchable until 10 hours of final batch annealing. Steel B annealed at 650° C. for 10 hours also showed similar formability parameters as steel A with same annealing conditions. Steel C annealed at 640° C. for 4 hours showed high bendability and flangeability but low stretchability. When steel C is annealed for 16 hours, stretchability also improves.

Cold formability of sheet steels is a combination of various parameters such as stretchability, bendability and flangeability. When the inventive steels are final batch annealed below 700° C. in their intercritical temperature range, annealing time is important to give the required amounts of Mn and C enrichment in retained austenite as has been observed previously since Mn is a slow diffusing element in steel. High Mn and C enrichment are necessary to achieve the high strain hardening rate. Therefore, the steels annealed less than 10 hours which exhibited lower strain hardening exponent also exhibited low stretchability, although other formability parameters were good. A high strain hardening exponent above 0.3 is necessary to achieve good stretchability in the inventive steels; otherwise premature local fracture can occur. Thus, from the results it appears that for good cold formability (combination of stretchability, bendability and flangeability) as mentioned in the claims a minimum of 10 hours final batch annealing is necessary for the inventive steels in order to achieve the minimum values of Mn and C enrichments in retained austenite When the formability of the 10 hours batch annealed samples is compared with the inventive steels, it is observed that the formability parameters of the inventive steels are in the range of high formable TWIP steel (reference steel E) and much higher than conventional DH1000 (reference steel D). The biaxial stretching strains of steel C even when annealed for only 4 hours are higher than those of conventional DH1000. This high cold formability of the inventive steels is because of the high fractions of metastable retained austenite with high Mn and C enrichment that is achieved in the inventive steels through the inventive processing steps.

The effects of temper rolling on the mechanical properties are shown for steel B annealed for 10 hours at 650° C. in Table 8. It is evident that the yield point elongation decreases with increasing temper rolling reduction. With 2% reduction, the yield point elongation disappeared. The tensile properties did not change much still being within the claimed range of this invention. Most importantly, the strain hardening exponent also remains high even up to 5% thickness reduction. Therefore, this elimination of yield point elongation without appreciable change in mechanical properties with up to 5% temper rolling will make the steel strips of this invention even more cold formable as this will reduce the risk of strain localization during stretch-forming as well as the stretcher marks on the surface of the formed articles.

TABLE 1

Composition of the steel in wt. %

| Steel | C | Mn | Si | Al | P | S | B | Cr | Mo | Ni | Cu |
|---|---|---|---|---|---|---|---|---|---|---|---|
| A | 0.094 | 7.15 | 0.20 | 1.54 | 0.001 | 0.0014 | 0.0001 | 0.003 | 0.01 | 0.0015 | 0.02 |
| B | 0.13 | 7.32 | 0.22 | 1.57 | 0.001 | 0.0011 | 0.0002 | 0.004 | 0.001 | 0.002 | 0.03 |
| C | 0.16 | 9.81 | 0.19 | 1.40 | 0.002 | 0.0018 | 0.0001 | 0.024 | 0.001 | 0.014 | 0.03 |
| D | 0.72 | 14.5 | 0.25 | 0.05 | 0.002 | 0.0012 | 0.0003 | 0.030 | 0.002 | 0.003 | 0.03 |
| E | 0.15 | 2.24 | 1.0 | 0.033 | 0.001 | 0.0001 | 0.0002 | 0.002 | 0.001 | 0.016 | 0.02 |

| Steel | Nb | Ti | V | W | N | Sn | Co | Fe | Remark |
|---|---|---|---|---|---|---|---|---|---|
| A | 0.0007 | 0.001 | 0.0014 | 0.001 | 0.005 | 0.0010 | 0.001 | Bal. | Invention |
| B | 0.0008 | 0.001 | 0.0013 | 0.001 | 0.004 | 0.0008 | 0.001 | Bal. | Invention |
| C | 0.0005 | 0.002 | 0.001 | 0.001 | 0.003 | 0.0007 | 0.0005 | Bal. | Invention |
| D | 0.0004 | 0.0001 | 0.002 | 0.002 | 0.006 | 0.0009 | 0.0004 | Bal. | Reference (TWIP) |
| E | 0.001 | 0.0016 | 0.001 | 0.001 | 0.0033 | 0.0008 | 0.0003 | Bal. | Reference (DH1000) |

TABLE 2

Phase fractions after intermediate-batch-annealing of the hot rolled strips

| Steel | Ferrite (vol. %) | Retained Austenite (vol. %) | Martensite (vol. %) |
|---|---|---|---|
| A | 83.3 | 14.4 | 2.3 |
| B | 79.5 | 18.4 | 2.1 |
| C | 71.6 | 28.4 | 0 |

TABLE 3

Phase fractions and average austenite and ferrite grain sizes after final batch annealing of the cold rolled strips

| Steel | Annealing Temperature (° C.) | Annealing Time (minute) | Phase Fractions (vol. %) Ferrite | Phase Fractions (vol. %) Retained Austenite | Phase Fractions (vol. %) Martensite | Average Grain size (μm) Ferrite | Average Grain size (μm) Retained Austenite |
|---|---|---|---|---|---|---|---|
| A | 650 | 2 | 49.5 | 10.7 | 39.8 | 0.50 | 0.20 |
|   |     | 5 | 50.1 | 33.2 | 16.7 | 0.70 | 0.34 |
|   |     | 60 | 49.3 | 36.9 | 13.8 | 0.85 | 0.38 |
|   |     | 600 | 49.1 | 40.2 | 10.7 | 1.20 | 0.40 |
| B | 650 | 600 | 48.9 | 42.7 | 8.4 | 1.30 | 0.41 |
| C | 640 | 240 | 41.2 | 56.3 | 2.5 | 1.01 | 0.50 |
|   |     | 960 | 39.5 | 60.5 | 0 | 1.90 | 0.89 |

TABLE 4

Manganese and carbon enrichments in retained austenite after final annealing of cold rolled material

| Steel | Annealing Temperature (° C.) | Annealing Time (minute) | Mn content (wt. %) | C content (wt. %) |
|---|---|---|---|---|
| A | 650 | 2 | 7.8 | 0.10 |
|   |     | 5 | 9.2 | 0.11 |
|   |     | 60 | 10.1 | 0.18 |
|   |     | 600 | 13.0 | 0.29 |
| B | 650 | 600 | 13.8 | 0.31 |
| C | 640 | 240 | 11.1 | 0.22 |
|   |     | 960 | 15.3 | 0.29 |

TABLE 5

Tensile properties of the steels after annealing of the cold rolled steels

| Steel | Annealing Temperature (° C.) | Annealing Time (minute) | Lower Yield Strength (MPa) | Ultimate Tensile Strength (MPa) | Total Elongation (%) | Yield Point Elongation (%) | Strain Hardening Exponent | Energy Absorption (MPa. %) |
|---|---|---|---|---|---|---|---|---|
| A | 650 | 2 | 1258 | 1323 | 3.1 | N.A. | N.A. | 4101.3 |
|   |     | 5 | 939 | 959 | 23.4 | 14.3 | 0.15 | 22440.6 |
|   |     | 60 | 844 | 860 | 28.5 | 13.2 | 0.15 | 24510 |
|   |     | 600 | 693 | 887 | 29.3 | 4.6 | 0.36 | 25989.1 |
| B | 650 | 600 | 702 | 910 | 32.1 | 5.2 | 0.37 | 29211 |
| C | 640 | 240 | 837 | 1149 | 35.1 | 14.2 | 0.37 | 40329.9 |
|   |     | 960 | 781 | 1114 | 42.3 | 8.7 | 0.42 | 47122.2 |

TABLE 6

Tensile properties and microstructure of the reference steels

| Steel | Yield Strength (MPa) | Ultimate Tensile Strength (MPa) | Total Elongation (%) | Energy Absorption (MPa. %) | Microstructure |
|---|---|---|---|---|---|
| D | 632 | 979 | 47.3 | 46306.7 | 100 vol. % Austenite |
| E | 798 | 1005 | 10.5 | 10552.5 | 8 vol. % Retained Austenite + 45 vol. % Martensite + 47 vol. % Ferrite |

TABLE 7

Formability parameters of the steels after final annealing

| Steel | Annealing Temperature (° C.) | Annealing Time (minute) | Biaxial Stretching Strain (%) Rolling Direction | Biaxial Stretching Strain (%) Transverse Direction | Bendability (°) L | Bendability (°) T | Hole Expansion Capacity (%) |
|---|---|---|---|---|---|---|---|
| A | 650 | 2 | 0 | 0 | 21.4 | 44.0 | 1 |
|   |     | 5 | 0 | 0 | 81.2 | 116.0 | 15 |
|   |     | 60 | 0 | 0 | 159.9 | 155.6 | 41 |
|   |     | 600 | 17.5 | 10.0 | 153.9 | 154.1 | 28 |
| B | 650 | 600 | 18.1 | 10.3 | 151.2 | 153.6 | 32 |
| C | 640 | 240 | 6.1 | 5.2 | 145.6 | 147.1 | 21 |
|   |     | 960 | 16.2 | 10.5 | 133.7 | 135.6 | 27 |
| D | N.A. |  | 2.0 | 3.0 | 96.5 | 100.2 | 15 |
| E |      |  | 17.5 | 19.0 | 143.1 | 147.8 | 41 |

TABLE 8

Tensile properties of steel B in temper rolled conditions applied after heat treating to best formable condition

| Final Batch Annealing | Temper Rolling Reduction (%) | Yield Point Elongation | Yield Strength (MPa) | Ultimate Tensile Strength (MPa) | Total Elongation (%) | Strain Hardening Exponent |
|---|---|---|---|---|---|---|
| 650° C., 10 hours | 0 | 5.2 | 702 | 910 | 32.1 | 0.37 |
|  | 0.5 | 3.5 | 695 | 878 | 32.1 | 0.37 |
|  | 1 | 0.5 | 703 | 881 | 32.0 | 0.37 |
|  | 2 | 0 | 693 | 883 | 31.5 | 0.37 |
|  | 5 | 0 | 768 | 927 | 30.4 | 0.36 |

The invention claimed is:

1. A method of manufacturing a cold rolled and annealed steel strip, composition of the steel being in wt. %:
C: 0.05-0.3;
Mn: 3.0-12.0;
Al: 0.03-3.0;
optionally one or more further alloying elements:
Si: less than 1.5;
Cr: less than 2.0;
V: less than 0.1;
Nb: less than 0.1;
Ti: less than 0.1;
Mo: less than 0.5
inevitable impurities; and
the remainder being Fe;
the method comprising the steps of:
providing the steel as molten steel:
casting the molten steel into a slab;
reheating the slab and holding it at a temperature of 1150° C. or more for a time of 1 hour or more;
hot rolling the steel into a hot rolled steel strip;
coiling the hot rolled steel strip;
pickling the steel strip;
intermediate-batch-annealing the coiled hot rolled steel strip at a temperature lower than 650° C. for longer than 24 hours to achieve at least 60 vol. % ferrite after cooling to room temperature;
cold rolling the intermediate-batch-annealed steel strip into a cold rolled steel strip and coiling the cold rolled steel strip to make a coiled steel strip;
batch annealing the coiled cold rolled steel strip:
at an intercritical temperature between Ac1 and Ac3 which is below 700° C.;
in a non-oxidising and non-nitrogenated atmosphere;
the total annealing time for which the steel strip is kept at said intercritical temperature being at least 5 hours in order to get Mn enrichment in austenite which is such that the Mn content is at least 1.25 times the bulk Mn content of the steel and C enrichment in austenite is such that the C content is at least 1.2 times the bulk C content of the steel;
cooling the steel strip after batch annealing in air, in forced air or by water quench.

2. The method according to claim 1, wherein reheating the slab is at a temperature of 1200° C. or more.

3. The method according to claim 1, wherein reheating the slab is at a temperature of 1250° C. or more.

4. The method according to claim 1, wherein batch annealing the coiled cold rolled steel strip takes place at an intercritical temperature below 660° C.

5. The method according to claim 1, wherein the steel strip resulting from the cooling of the steel strip after batch annealing in air, in forced air or by water quench is coated with any metallic coating applied by hot dip galvanising, galvannealing, electro-galvanising, aluminising PVD, or CVD.

6. The method according to claim 1, wherein the steel strip resulting from the cooling of the steel strip after batch annealing in air, in forced air or by water quench steel strip undergoes skin pass rolling.

7. The method according to claim 6, wherein the skin pass rolling takes place with a thickness reduction of 5% or less.

8. The method according to claim 1,
wherein the batch annealed steel strip has the Mn enrichment in austenite which is such that the Mn content is at least 1.4 times the bulk Mn content of the steel and the C enrichment in austenite is such that the C content is at least 2.3 times the bulk C content of the steel, in order to obtain metastable retained austenite to give the steel after batch annealing a high strain hardening exponent of at least 0.3 measured after yield point elongation for a strain range of 7% in a quasi-static tensile test, wherein the steel after batch annealing has a microstructure that comprises in vol.
ferrite: 30-70%;
retained austenite: 20-65%;
martensite: <20%, including 0 vol. %.

9. The method according to claim 8, wherein a length/width ratio of grains of the ferrite is 3 or smaller.

10. The method according to claim 8, wherein the steel strip resulting from the cooling of the steel strip after batch annealing in air, in forced air or by water quench has a yield point elongation of a maximum of 10% engineering strain measured from its engineering stress-strain curve.

11. The method according to claim 8, wherein the steel strip resulting from the cooling of the steel strip after batch annealing in air, in forced air or by water quench has a yield strength of 600 MPa or more and an ultimate tensile strength of 800 MPa or more and a total elongation (A80) of 20% or more.

12. The method according to claim 8, wherein the steel strip resulting from the cooling of the steel strip after batch annealing in air, in forced air or by water quench has a very high formability characterized by an individual direction stretching strain in biaxial stretching condition of 10% or more, a VDA bending angle at 1.0 mm thickness of 100° or more and a hole expansion capacity of 20% or more.

13. The method according to claim 1, wherein the inevitable impurities have
S: less than 20 ppm;
P: less than 0.04.

14. The method according to claim 5, wherein the resulting strip is coated with any metallic coating applied by hot dip galvanising, galvannealing, electro-galvanising, or aluminising.

15. The method according to claim 5, wherein the resulting strip is coated with any metallic coating applied by PVD or CVD.

16. The method according to claim 1, wherein the hot rolling of the steel into the hot rolled steel strip has an average F1 slab entry temperature of above 1000° C.

17. The method according to claim 1, wherein the total annealing time for which the steel strip is kept at said intercritical temperature being at least 10 hours.

* * * * *